United States Patent
Kondo (10) Patent No.: US 10,507,753 B2
(45) Date of Patent: Dec. 17, 2019

(54) CUP HOLDER

(71) Applicant: TOYOTA BOSHOKU KABUSHIKI KAISHA, Aichi-ken (JP)

(72) Inventor: Shuhei Kondo, Aichi-ken (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 15/893,059

(22) Filed: Feb. 9, 2018

(65) Prior Publication Data

US 2018/0236921 A1 Aug. 23, 2018

(30) Foreign Application Priority Data

Feb. 17, 2017 (JP) .................................. 2017-027695

(51) Int. Cl.
*B60R 7/06* (2006.01)
*B60N 3/10* (2006.01)
*B60N 3/00* (2006.01)

(52) U.S. Cl.
CPC ............. *B60N 3/108* (2013.01); *B60N 3/004* (2013.01); *B60N 3/102* (2013.01)

(58) Field of Classification Search
CPC .......... B60N 3/10; B60N 3/107; B60N 3/101; B60N 3/105
USPC ..................... 224/275, 926; D9/751; 206/563
See application file for complete search history.

(56) References Cited

U.S. PATENT DOCUMENTS

| 3,163,287 | A | * | 12/1964 | Barnett | A47G 23/0641 108/44 |
| 3,338,628 | A | * | 8/1967 | Evans | A61G 5/10 108/47 |
| 3,817,190 | A | * | 6/1974 | Evangelista | A47B 5/04 108/44 |
| 4,156,484 | A | * | 5/1979 | Wischusen | B65D 5/48004 206/563 |
| 4,940,003 | A | * | 7/1990 | Mayhew | B60N 3/002 108/25 |
| 4,972,781 | A | * | 11/1990 | Montgomery | A47B 3/08 108/19 |
| 5,628,486 | A | * | 5/1997 | Rossman | B60N 3/102 224/926 |
| 5,642,843 | A | * | 7/1997 | Leivan | B60N 3/102 224/281 |
| 5,745,565 | A | * | 4/1998 | Wakefield | B60N 3/103 224/926 |

(Continued)

FOREIGN PATENT DOCUMENTS

JP  2005-000197  1/2005

*Primary Examiner* — Adam J Waggenspack
(74) *Attorney, Agent, or Firm* — Greenblum & Bernstein, P.L.C.

(57) ABSTRACT

A cup holder includes an enclosure portion configured to hold a drink container inserted therein so as to surround the drink container from an outer peripheral side. An inner peripheral surface of the enclosure portion includes inner peripheral supporting surfaces and recessed surfaces arranged side by side in a circumferential direction, the inner peripheral supporting surfaces extending in the circumferential direction so as to continuously or intermittently draw arc surfaces concentric to each other with the same diameter, the recessed surfaces extending in the circumferential direction in a shape recessed radially outward relative to the inner peripheral supporting surfaces.

4 Claims, 6 Drawing Sheets

(56) References Cited

U.S. PATENT DOCUMENTS

| | | | | |
|---|---|---|---|---|
| 5,749,554 A * | 5/1998 | Avila | ............... | B60N 3/102 |
| | | | | 224/281 |
| 6,439,388 B1 * | 8/2002 | Lerner | ............... | A47G 19/065 |
| | | | | 206/562 |
| 7,731,144 B2 * | 6/2010 | Kazyaka | ............... | B60N 3/107 |
| | | | | 248/311.2 |
| 2011/0240810 A1 * | 10/2011 | France | ............... | B60N 3/102 |
| | | | | 248/220.21 |

* cited by examiner

CUP HOLDER

INCORPORATION BY REFERENCE

The disclosure of Japanese Patent Application No. 2017-027695 filed on Feb. 17, 2017 including the specification, drawings and abstract is incorporated herein by reference in its entirety.

BACKGROUND

1. Technical Field

The present disclosure relates to a cup holder. More specifically, the present disclosure relates to a cup holder having an enclosure portion that holds a drink container inserted from a predetermined opening direction, so as to surround the drink container from an outer peripheral side.

2. Description of Related Art

There has been known a configuration in which a recessed cup holder is provided in a table set in a vehicle seat (Japanese Patent Application Publication No. 2005-197 (JP 2005-197 A)). The cup holder is formed in a bottomed recessed shape that can support a drink container set therein in a state where the drink container is surrounded by the cup holder from its outer peripheral side while touching a bottom of the cup holder.

SUMMARY

However, in a case where a cup holder has such a simple configuration that a round hole is formed in a table and a drink container is fitted to an outer periphery of the round hole so as to be supported, when the drink container is grasped to be taken out from the cup holder, the drink container is bent to be pressed against the outer periphery of the cup holder, which might make it difficult to remove the drink container from the cup holder. The present disclosure provides a cup holder that can improve easy removal of a drink container.

The cup holder of the present disclosure takes the following approach.

A cup holder according to an aspect of the present disclosure includes an enclosure portion configured to hold a drink container inserted from a predetermined opening direction so as to surround the drink container from an outer peripheral side. An inner peripheral surface of the enclosure portion includes inner peripheral supporting surfaces and recessed surfaces arranged side by side in a circumferential direction, the inner peripheral supporting surfaces extending in the circumferential direction so as to continuously or intermittently draw arc surfaces concentric to each other with the same diameter, the recessed surfaces extending in the circumferential direction in a shape recessed radially outward relative to the inner peripheral supporting surfaces.

In the above aspect, even if the drink container inserted in the enclosure portion is grasped to be pulled out therefrom such that a part of the drink container is bent by pressing in a swollen manner by a grasped force, an amount of bending is released by the recessed surfaces of the enclosure portion. Hereby, the drink container can be hardly pressed against the inner peripheral supporting surfaces, thereby making it possible to easily take out the drink container.

In the above aspect, the enclosure portion may support, from the outer peripheral side, the drink container inserted from the predetermined opening direction by receiving the drink container by the inner peripheral supporting surfaces.

With the above configuration, even if the drink container is set in a state where the drink container is pressed against the inner peripheral supporting surfaces of the enclosure portion, the swelling of the drink container at the time when the drink container is pulled out is released by the recessed surfaces of the enclosure portion, thereby making it possible to easily take out the drink container.

In the above aspect, the recessed surfaces may be placed equally at a plurality of positions in the circumferential direction on the inner peripheral surface of the enclosure portion.

With the above configuration, the recessed surfaces of the enclosure portion are distributed widely over the circumferential direction, and therefore, even if the drink container is grasped so as to be swollen in any part in the circumferential direction, the swelling of the drink container can be easily released as appropriate.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

An embodiment to carry out the invention will be described below with reference to the drawings.

Figure 1:
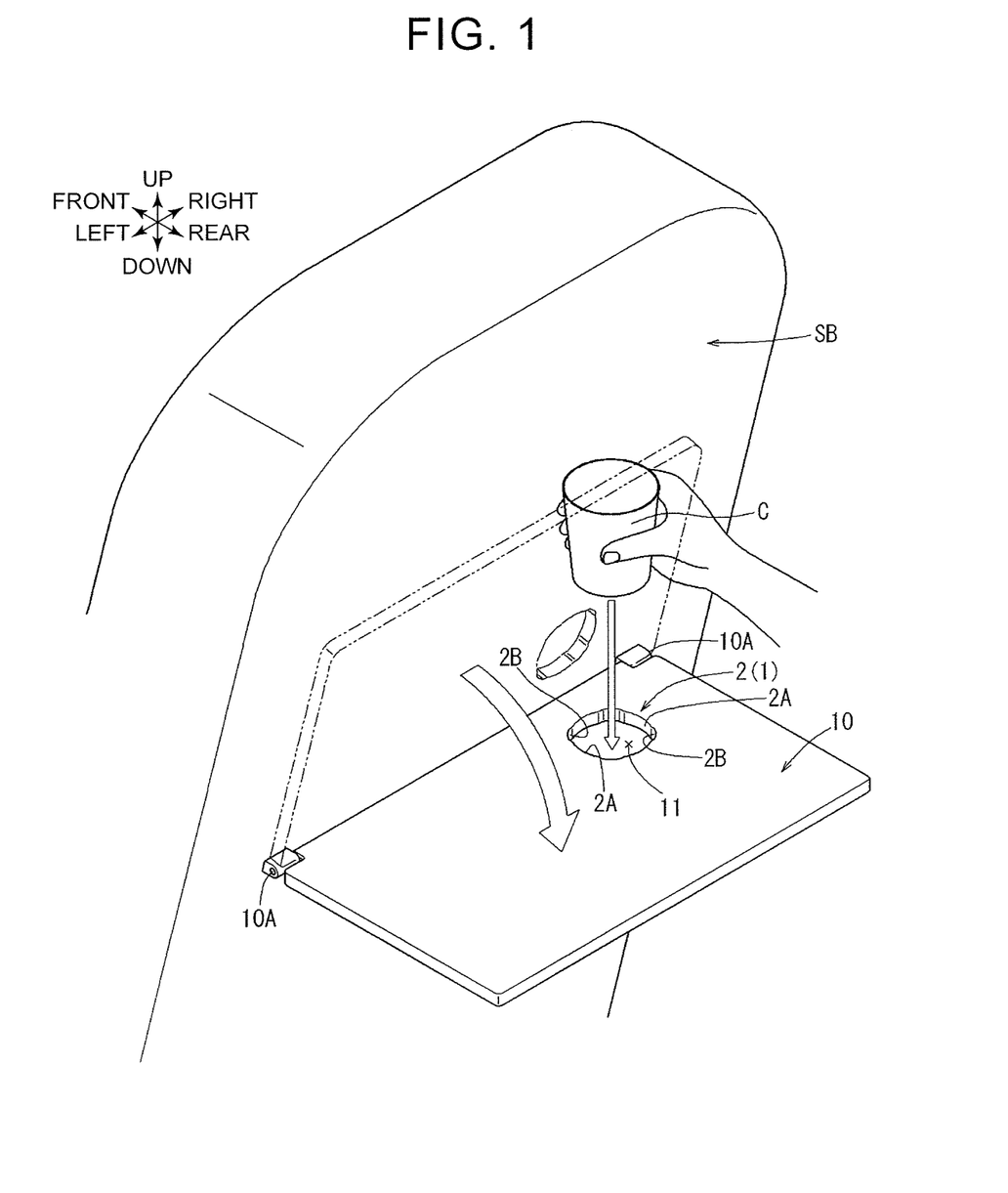
FIG. 1 is a perspective view illustrating a schematic configuration of a vehicle cup holder according to Embodiment 1.

First described is a configuration of a cup holder 1 (a vehicle cup holder) of Embodiment 1 with reference to FIGS. 1 to 6. Note that, in the following description, when directions of front, rear, up, down, right, left, and the like are mentioned, they indicate respective directions provided in each drawing. The cup holder 1 of the present embodiment is formed in a table 10 attached to a back face of a seatback SB of an aircraft seat, as illustrated in FIG. 1. The table 10 has a generally flat-shaped configuration that is usable as a small-article tray and is configured to be hingedly connected to the back face of the seatback SB with a hinge shaft 10A extending in a width direction in a reclinable and rotatable manner.

With such a connection, the table 10 can be switched between a stored position at which the table 10 is folded on the back surface of the seatback SB and a use position at which the table 10 is tilted rearward from the stored position so as to be unfolded. The cup holder 1 as described above is formed in the table 10 in a shape having an enclosure portion 2 that can hold a drink container C inserted therein from an upper side in a surrounded manner from an outer peripheral side, the enclosure portion 2 being formed by a generally round through-hole 11 formed so as to penetrate a part of the table 10 in a cylindrical manner in a height direction in a usage state.

Figure 2:
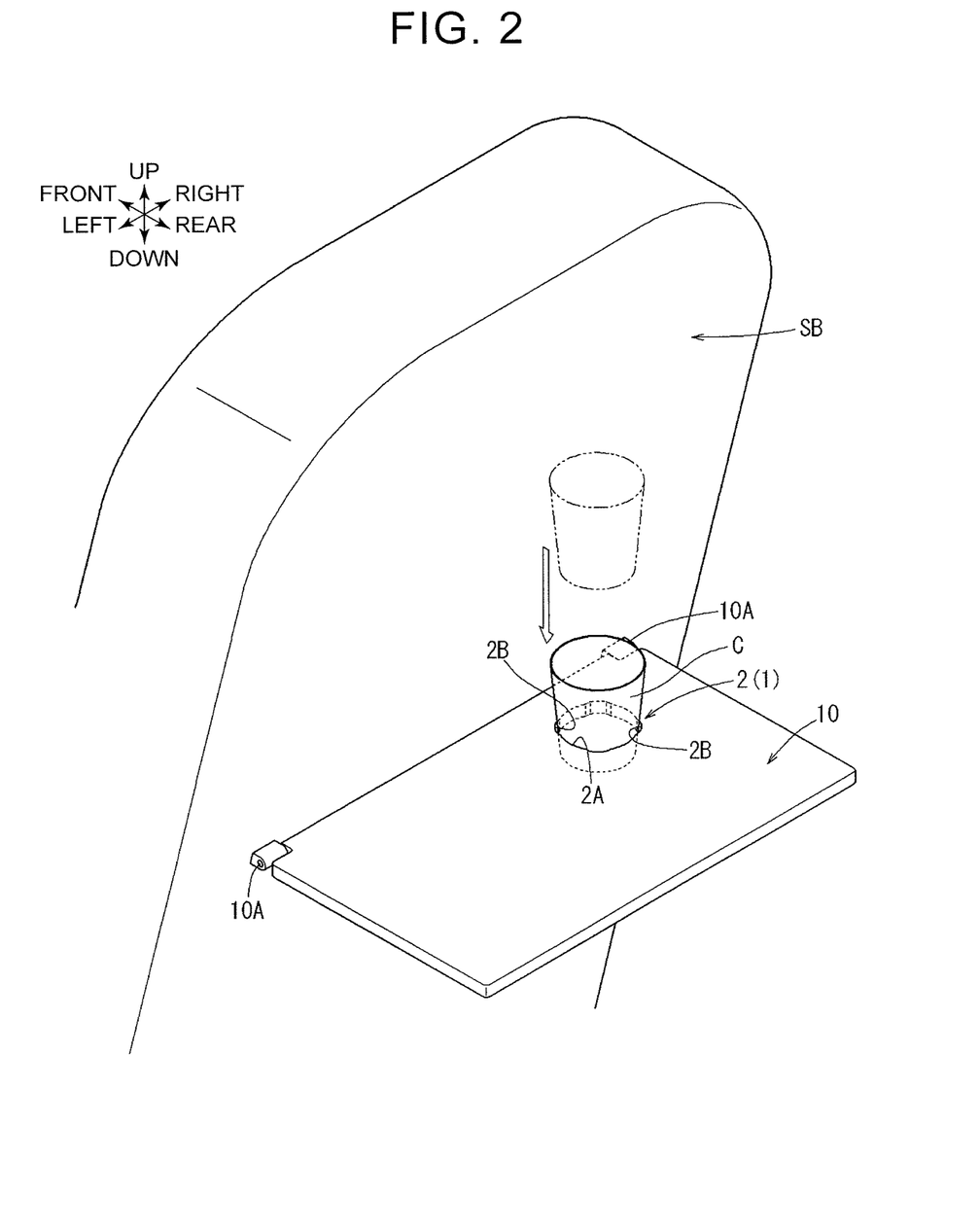
FIG. 2 is a perspective view illustrating a state where a drink container is set in the cup holder.
Figure 3:
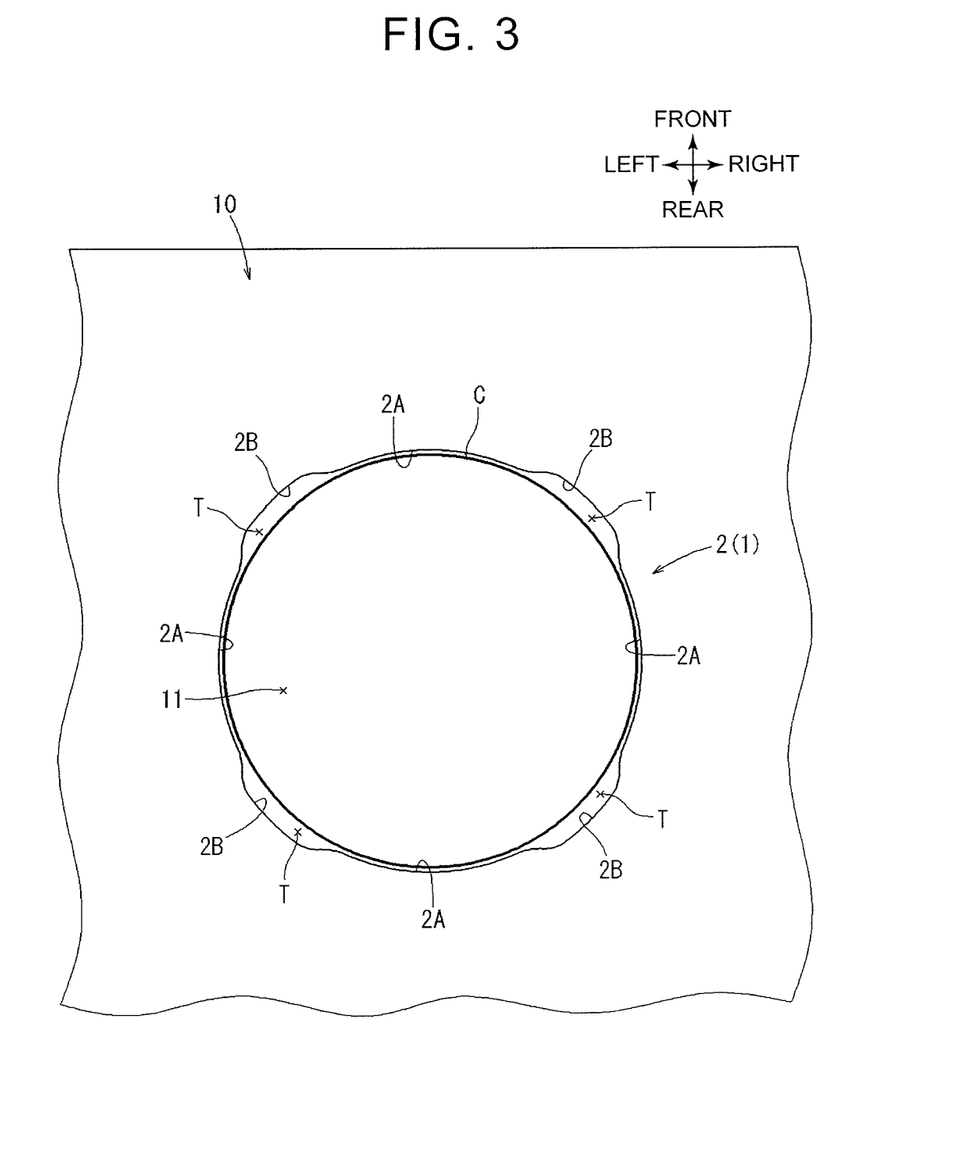
FIG. 3 is a plan view of a state of FIG. 2 with the drink container being illustrated schematically.

The enclosure portion 2 has a bottomless support structure in which the drink container C having an inclined outer peripheral surface in a reverse circular cone shape like a paper cup is inserted into an opening of the enclosure portion 2 from an upper side, so that the outer peripheral surface of the drink container C is received and supported by an inner peripheral surface of the enclosure portion 2 in an insertion direction, as illustrated in FIGS. 2 to 3. More specifically, the inner peripheral surface of the enclosure portion 2 is formed in a shape in which inner peripheral supporting surfaces 2A and recessed surfaces 2B are arranged side by side in a circumferential direction. The inner peripheral supporting surfaces 2A extend in the circumferential direction so as to intermittently draw arc surfaces concentric to each other with the same diameter, and the recessed surfaces 2B extend in the circumferential direction in a shape recessed radially outward relative to the inner peripheral supporting surfaces 2A.

More specifically, the inner peripheral supporting surfaces 2A lock the drink container C inserted in the opening of the enclosure portion 2 from the upper side, by their inner peripheral surface shapes drawing the arc surfaces concentric to each other with the same diameter, in a state where the drink container C is fitted in an insertion direction (a gravitational direction) at a position where an intermittent circular shape drawn by the inner peripheral supporting surfaces 2A is matched with an outer peripheral surface of a perfect circle shape of the drink container C. Further, the recessed surfaces 2B are configured such that, in a state where the outer peripheral surface of the drink container C abuts with the inner peripheral supporting surfaces 2A in a locked manner, respective gaps T are formed in a radial direction between the recessed surfaces 2B and the outer peripheral surface of the drink container C. The recessed surfaces 2B are also formed in surface shapes extending in the circumferential direction so as to intermittently draw arc surfaces concentric to each other with the same diameter.

Figure 4:
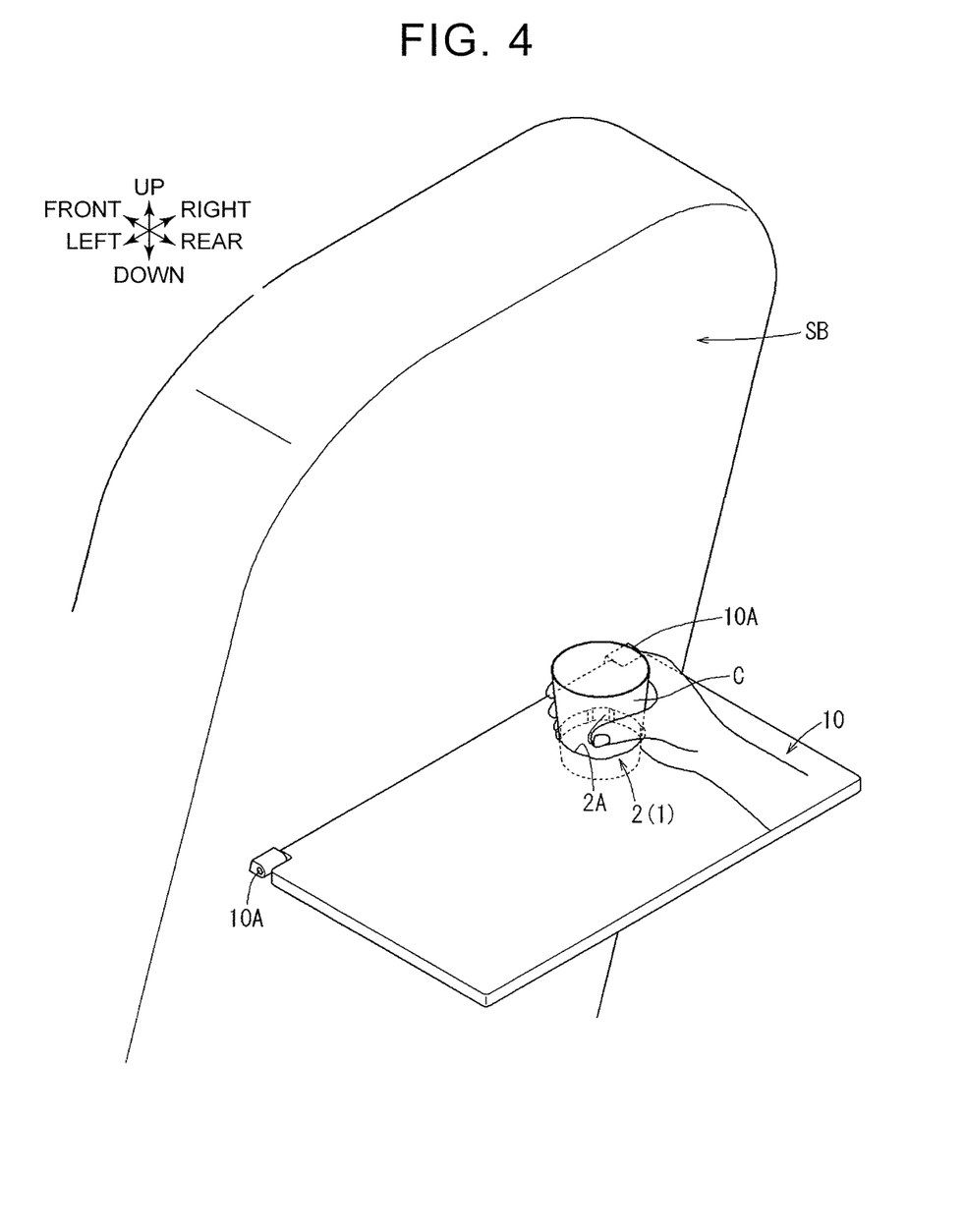
FIG. 4 is a perspective view illustrating a state where the drink container in the cup holder is grasped.
Figure 5:
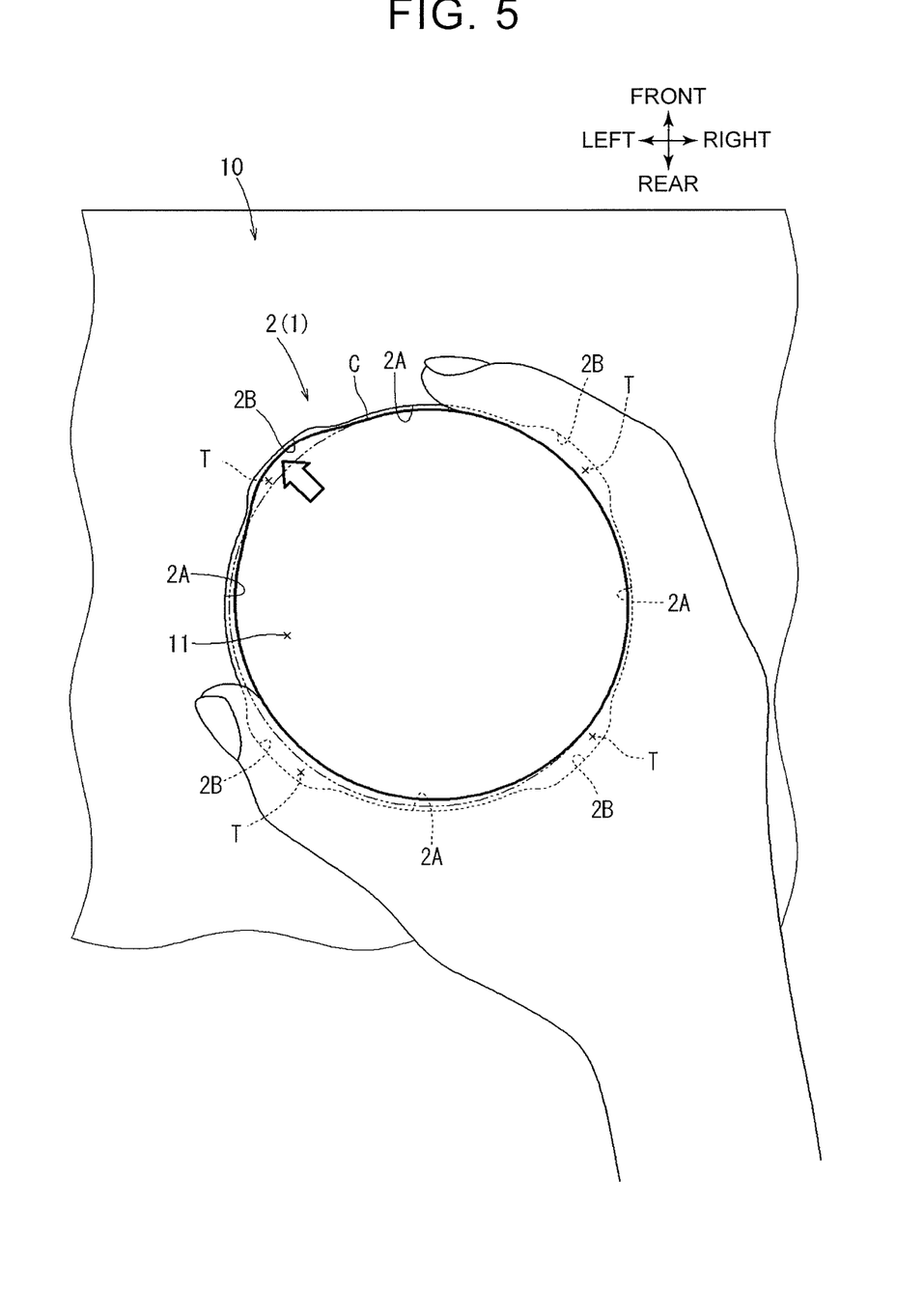
FIG. 5 is a plan view of a state of FIG. 4 with the drink container being illustrated schematically.
Figure 6:
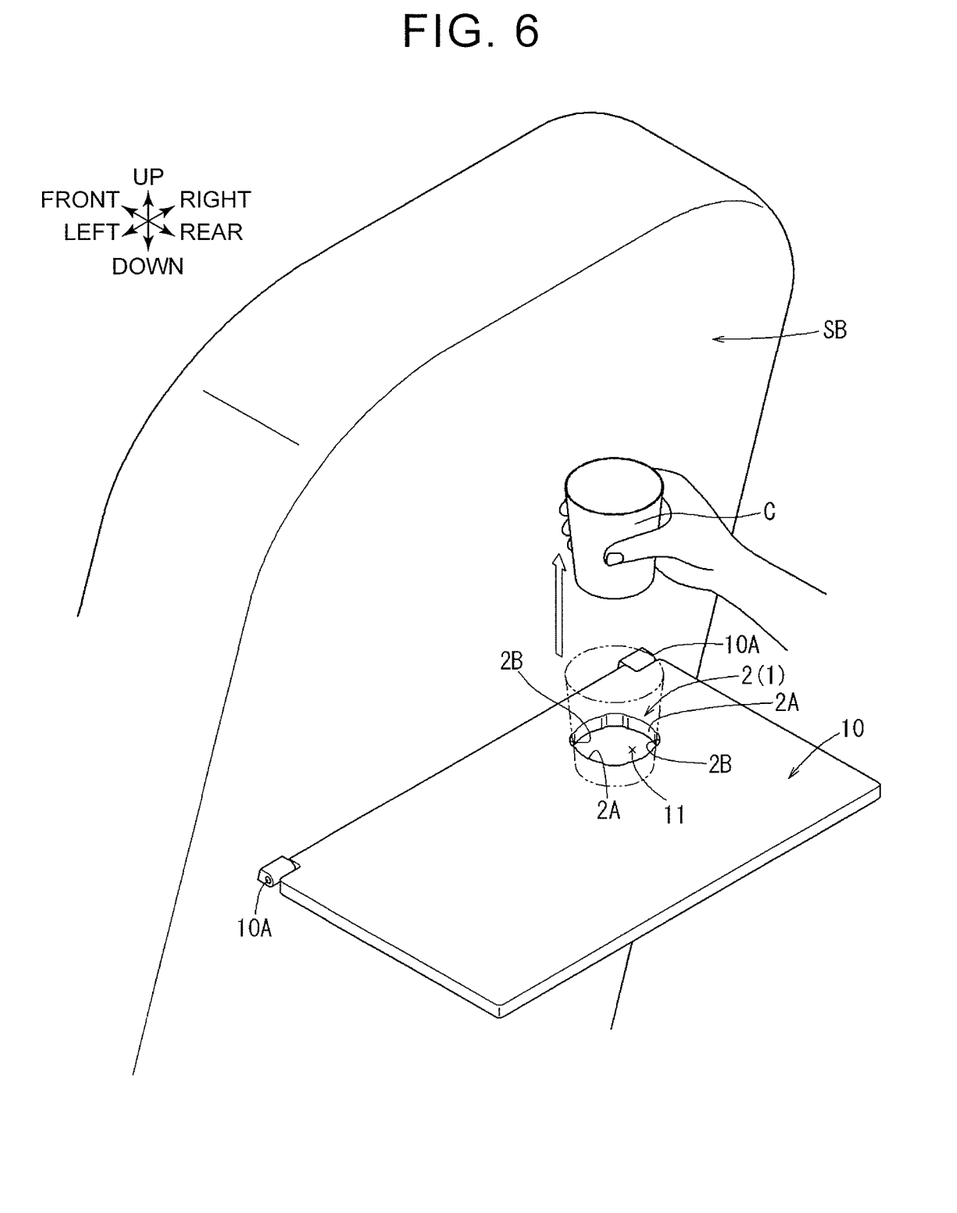
FIG. 6 is a perspective view illustrating a state where the drink container is taken out from the cup holder.

The recessed surfaces 2B are equally distributively placed at four positions in the circumferential direction on the inner peripheral surface of the enclosure portion 2. The recessed surfaces 2B function to release an amount of bending of the drink container C by their recessed shapes when the drink container C set in the enclosure portion 2 is grasped by a user such that a part (a part that is not grasped or the like part) of the drink container C is bent by pressing in a swollen manner by a grasped force as illustrated in FIGS. 4 to 5. Hereby, the drink container C can be hardly pressed against the inner peripheral supporting surfaces 2A, so that the drink container C can be easily taken out as illustrated in FIG. 6.

Note that the table 10 as described above is configured such that a resin cover material covers a base material made of a metal panel, and the enclosure portion 2 constituting the cup holder 1 as described above is configured such that its inner peripheral surface is shaped by the resin cover material. The enclosure portion 2 supports the drink container C set therein such that upper edges of the inner peripheral supporting surfaces 2A covered with the resin cover material abut with the drink container C from the outer peripheral side. However, even in a case where the drink container C slips off in the gravitational direction due to a weight of the drink container C from a position where the drink container C abuts with the upper edges of the inner peripheral supporting surfaces 2A so as to be supported, the enclosure portion 2 can support the drink container C from the outer peripheral side such that the enclosure portion 2 makes surface contact with the drink container C over a wide range in the height direction due to height widths of the inner peripheral supporting surfaces 2A.

To summarize the above, the cup holder 1 of the present embodiment is configured as follows. That is, the cup holder 1 is a vehicle cup holder (the cup holder 1) having an enclosure portion (the enclosure portion 2) that holds a drink container (the drink container C) inserted from a predetermined opening direction (an upper direction) so as to surround the drink container from an outer peripheral side. An inner peripheral surface of the enclosure portion (the enclosure portion 2) includes inner peripheral supporting surfaces (the inner peripheral supporting surfaces 2A) and recessed surfaces (the recessed surfaces 2B) arranged side by side in a circumferential direction, the inner peripheral supporting surfaces (the inner peripheral supporting surfaces 2A) extending in the circumferential direction so as to intermittently draw arc surfaces concentric to each other with the same diameter, the recessed surfaces (the recessed surfaces 2B) extending in the circumferential direction in a shape recessed radially outward relative to the inner peripheral supporting surfaces (the inner peripheral supporting surfaces 2A).

With such a configuration, even if the drink container (the drink container C) inserted in the enclosure portion (the enclosure portion 2) is grasped to be taken out therefrom such that a part of the drink container (the drink container C) is bent by pressing in a swollen manner by a grasped force, an amount of bending is released by the recessed surfaces (the recessed surfaces 2B) of the enclosure portion (the enclosure portion 2). Hereby, the drink container (the drink container C) can be hardly pressed against the inner peripheral supporting surfaces (the inner peripheral supporting surfaces 2A), thereby making it possible to easily take out the drink container (the drink container C).

Further, the enclosure portion (the enclosure portion 2) has a bottomless support structure in which the drink container (the drink container C) inserted from the predetermined opening direction (the upper direction) is received by the inner peripheral supporting surfaces (the inner peripheral supporting surfaces 2A) in an insertion direction so as to be supported from the outer peripheral side. With such a configuration, even if the drink container (the drink container C) is set in a state where the drink container (the drink container C) is pressed against the inner peripheral supporting surfaces (the inner peripheral supporting surfaces 2A) of the enclosure portion (the enclosure portion 2), the swelling of the drink container (the drink container C) at the time when the drink container (the drink container C) is pulled out is released by the recessed surfaces (the recessed surfaces 2B) of the enclosure portion (the enclosure portion 2), thereby making it possible to easily take out the drink container (the drink container C).

Further, the recessed surfaces (the recessed surfaces 2B) are placed equally at a plurality of positions in the circumferential direction on the inner peripheral surface of the enclosure portion (the enclosure portion 2). With such a configuration, the recessed surfaces (the recessed surfaces 2B) of the enclosure portion (the enclosure portion 2) are distributed widely over the circumferential direction, and therefore, even if the drink container (the drink container C) is grasped so as to be swollen in any part in the circumferential direction, the swelling of the drink container (the drink container C) can be easily released as appropriate.

The embodiment of the invention has been described above with reference to one example, but the invention can be performed in various embodiments other than the above example. For example, the vehicle cup holder of the present invention can be used not only for the aircraft, but also for various vehicles such as an automobile, a train, and a vessel. Further, the vehicle cup holder may be attached to a seat in a vehicle, or may be attached to a body such as a side wall of a vehicle. Further, the vehicle cup holder may be provided in accompany with an accessory such as a table in a vehicle such that a hole is formed therein, or may be formed solely so as to have an enclosure portion.

Further, the vehicle cup holder may not necessarily be the bottomless support structure in which the drink container inserted in the enclosure portion is received by the inner peripheral supporting surfaces in the insertion direction so as to be supported from the outer peripheral side, but may have a bottomed configuration in which a drink container placed so as to touch a bottom of the vehicle cup holder is held in a state where the drink container is surrounded from its outer peripheral side with a gap. Further, the recessed surfaces of the enclosure portion may not be configured such that their inner peripheral surfaces are formed as arc surfaces, provided that the recessed surfaces are recessed radially outward relative to the inner peripheral supporting surfaces of the enclosure portion so as to extend in the circumferential direction.

Further, the inner peripheral surface of the enclosure portion should be configured such that at least one inner peripheral supporting surface and at least one recessed surface are arranged side by side in the circumferential direction, and may be configured such that not less three but not more than five recessed surfaces are arranged in the circumferential direction. Note that, in a configuration where the recessed surface is formed at only one position in the circumferential direction, the inner peripheral supporting surface is also formed at only one position in the circumferential direction. In terms of a length relationship of the recessed surface and the inner peripheral supporting surface extending in the circumferential direction, either one of them may be longer or both may have the same length. Further, in a case where the recessed surfaces are formed at several positions in the circumferential direction, the recessed surfaces may not have a uniform length in the circumferential direction, and may not to be placed equally in the circumferential direction.

Further, the opening direction of the enclosure portion may be a lateral direction or a direction inclined to the lateral direction, other than the upper direction. Further, the drink container to be set in the enclosure portion may be a drink container having a waistless cylindrical shape such as a plastic bottle, other than a drink container in a shape having an outer peripheral surface inclined in a reverse circular cone shape.

What is claimed is:

1. A cup holder having an upper surface and a lower surface, and comprising an enclosure portion configured to hold a drink container inserted from a predetermined opening direction so as to surround the drink container from an outer peripheral side,
   wherein an inner peripheral surface of the enclosure portion includes inner peripheral supporting surfaces and recessed surfaces arranged side by side in a circumferential direction, the inner peripheral supporting surfaces extending in the circumferential direction so as to continuously or intermittently draw circular arc surfaces concentric to each other with a first same diameter, the recessed surfaces extending in the circumferential direction in a shape recessed radially outward relative to the inner peripheral supporting surfaces,
   wherein the recessed surfaces comprise surface shapes extending in the circumferential direction so as to intermittently draw circular arc surfaces concentric to each other with a second same diameter,
   wherein each of the inner peripheral supporting surfaces and each of the recessed surfaces extend from the upper surface to the lower surface, and
   wherein the inner peripheral surfaces cannot deflect relative to the recessed surfaces.

2. The cup holder according to claim 1, wherein the enclosure portion is structured to support, from the outer peripheral side, the drink container insertable from the predetermined opening direction by supporting the drink container by the inner peripheral supporting surfaces.

3. The cup holder according to claim 2, wherein the recessed surfaces are placed equally at a plurality of positions in the circumferential direction on the inner peripheral surface of the enclosure portion.

4. The cup holder according to claim 1, wherein the recessed surfaces are placed equally at a plurality of positions in the circumferential direction on the inner peripheral surface of the enclosure portion.

* * * * *